United States Patent [19]

Mattsson et al.

[11] 4,075,427
[45] Feb. 21, 1978

[54] SYSTEM FOR PHASE DIVISION MULTIPLEX DUPLEX COMMUNICATION OVER A TWO-WIRE CIRCUIT BETWEEN A MASTER TERMINAL AND A SLAVE TERMINAL

[75] Inventors: Örjan Mats Mattsson, Farsta; Walter Herbert Erwin Widl, Bandhagen, both of Sweden

[73] Assignee: Telefonaktiebolaget L M Ericsson, Stockholm, Sweden

[21] Appl. No.: 741,567

[22] Filed: Nov. 15, 1976

[30] Foreign Application Priority Data

Dec. 2, 1975 Sweden .................................. 7513605

[51] Int. Cl.² .......................... H04J 11/00; H04L 5/14
[52] U.S. Cl. ............................... 179/15 BC; 178/58 R;
179/2.5 R; 179/15 BP; 343/175
[58] Field of Search ............ 179/15 BC, 15 BP, 25 R;
178/58 R; 343/175, 179, 180

[56] References Cited

U.S. PATENT DOCUMENTS

| 3,384,824 | 5/1968 | Grenier | 179/15 BC |
|---|---|---|---|
| 3,518,680 | 6/1970 | McAuliffe | 179/15 BC |
| 3,795,772 | 5/1974 | Hill | 179/15 BC |
| 3,822,366 | 7/1974 | O'Dea | 179/2.5 R |

*Primary Examiner*—David L. Stewart
*Attorney, Agent, or Firm*—Hane, Roberts, Spiecens & Cohen

[57] ABSTRACT

A system for phase division multiplex duplex communication over a two-wire circuit has a master terminal and a slave terminal. The master terminal comprises a modulator and a demodulator jointly connected to a first end of the two-wire circuit and arranged to transmit an outgoing AM-signal with an essentially non-suppressed carrier component constituting a pilot signal and to receive an incoming AM-signal with a considerably suppressed carrier component having a frequency identical to the frequency of the pilot signal. An oscillator circuit is arranged to supply the modulator and the demodulator with a first and secnd, respectively, oscillator signal having a respective frequency identical to the frequency of the pilot signal and having such a relative phasing that at the demodulator the phase of the second oscillator signal is phase displaced 90° relative to the phase of the pilot signal. The slave terminal comprises a demodulator and a modulator jointly connected to a second end of the two-wire circuit and arranged to receive the AM-signal with the pilot signal and to transmit the AM-signal with the suppressed carrier component. An oscillator circuit is arranged to supply the demodulator and the modulator with a third and fourth, respectively, oscillator signal having a respective frequency identical to the frequency of the pilot signal and having such a phasing relative so that at the demodulator the phase of the third oscillator signal coincides with the phase of the pilot signal while the phase of the suppressed carrier component is phase displaced 90° relative to the latter.

5 Claims, 3 Drawing Figures

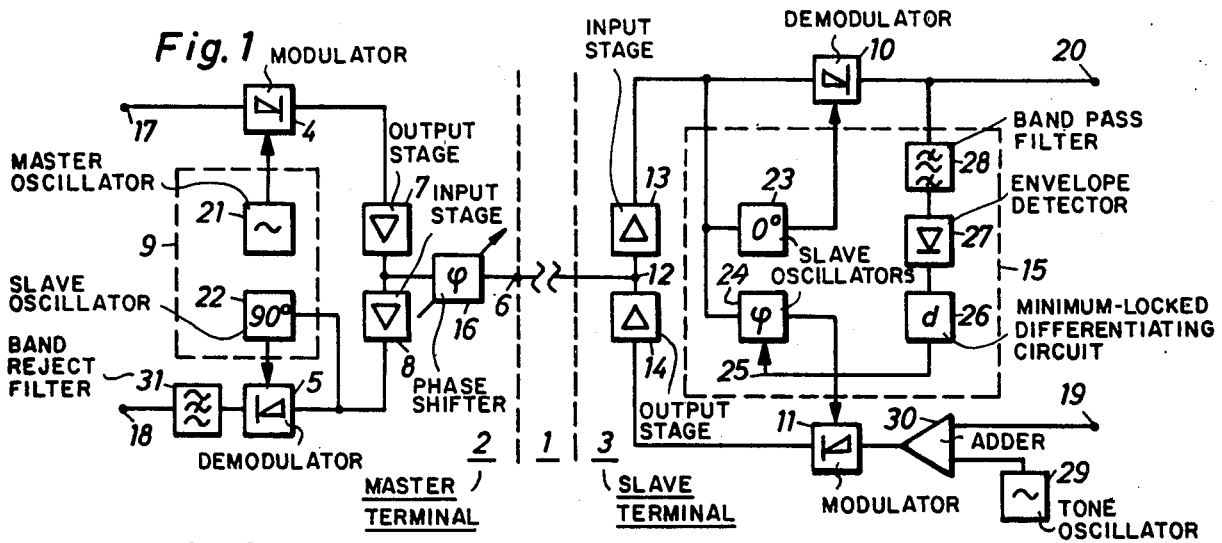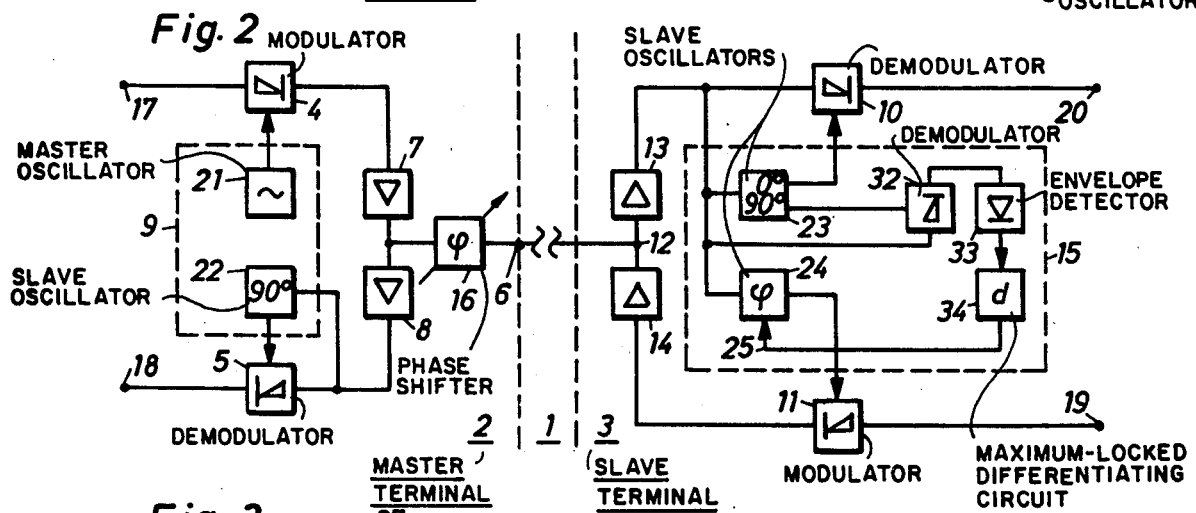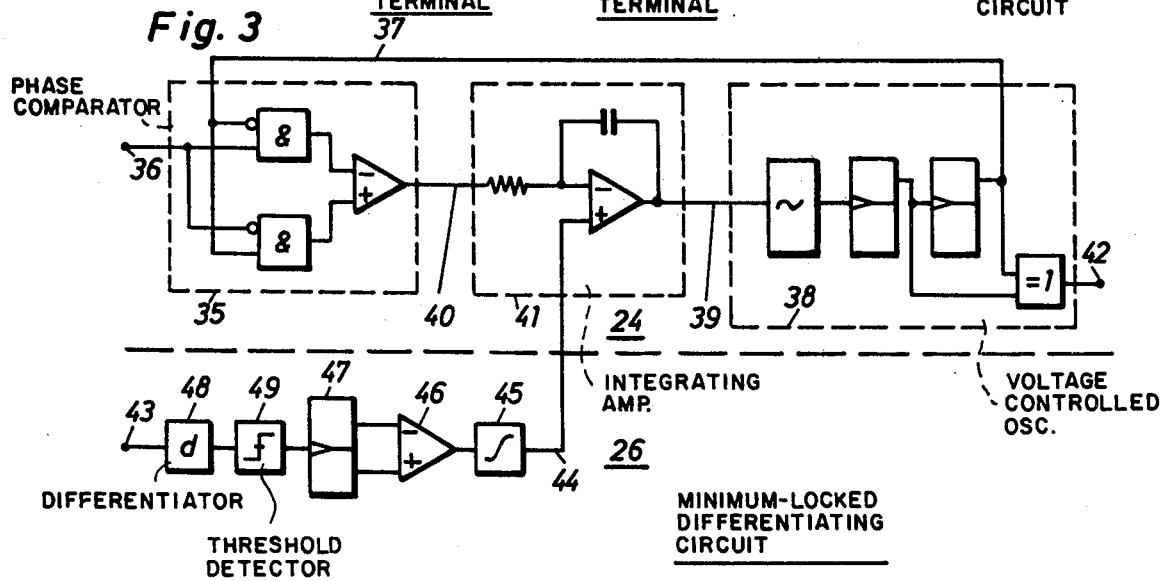

SYSTEM FOR PHASE DIVISION MULTIPLEX DUPLEX COMMUNICATION OVER A TWO-WIRE CIRCUIT BETWEEN A MASTER TERMINAL AND A SLAVE TERMINAL

The invention relates to a system for phase division multiplex duplex communication over a two-wire circuit between a master terminal and a slave terminal and is primarily intended to be used for digital transmission of speech or data over a subscriber line in a telephone network.

Alternative methods for duplex communication over a two-wire circuit are frequency division multiplex, time division multiplex and the use of balanced hybrid circuits. Frequency division multiplex has the drawback of requiring a certain frequency interval for band separation. With time division multiplex, a time interval is lost each time that the transfer direction is switched, and balanced hybrid circuits require a critical alignment.

The system of the invention uses phase division multiplex in order to provide duplex communication over a two-wire circuit and has the advantage of not requiring any frequency interval for band separation, any time interval for switching of the transfer direction, nor any critical alignment.

The system of the invention, the characteristics of which appear from the appended claims, will now be described more in detail with reference to accompanying drawing where:

FIG. 1 shows a block diagram of a preferred embodiment of the system of the invention;

FIG. 2 shows a block diagram of a modified embodiment of the same; and

FIG. 3 shows a circuit diagram of two co-operating function blocks in FIG. 1.

FIG. 1 shows a block diagram of a preferred embodiment of the system of the invention for duplex communication over a two-wire circuit 1 between a master terminal 2 and a slave terminal 3. The master terminal 2 comprises a modulator 4 and a demodulator 5 jointly connected to a first end 6 of the two-wire circuit 1 and arranged to transmit, via an output stage 7, an outgoing AM-signal with an essentially non-suppressed carrier component intended to constitute a pilot signal and to receive, respectively, via an input stage 8, an incoming AM-signal with a considerably suppressed carrier component having a frequency identical to the frequency of the pilot signal. An oscillator circuit 9 is arranged to supply the modulator 4 and the demodulator 5 with a first and a second, respectively, oscillator signal having a respecitve frequency identical to the frequency of the pilot signal and having such a relative phasing that, at the demodulator 5, the phase of the second oscillator signal is 90° out of phase with the phase of the pilot signal.

The slave terminal 3 comprises a demodulator 10 and a modulator 11 which are jointly connected to a second end 12 of the two-wire circuit 1, and, are arranged to receive, via an input stage 13, the AM-signal with the pilot signal and to transmit, respectively, via an outgoing stage 14, the AM-signal with the suppressed carrier component. An oscillator circuit 15 is arranged to supply the demodulator 10 and the modulator 11 with a third and a fourth, respectively, oscillator signal having a respective frequency identical to the frequency of the pilot signal and having such a phasing relative to the pilot signal, that at the demodulator 10, the phase of the third oscillator signal coincides with the phase of the pilot signal while the phase of the suppressed carrier component is 90° out of phase with the latter.

The modulators 4 and 11 as well as the demodulators 5 and 10, are, according to the example of a balanced type. The modulator 4 should have its balancing slightly misaligned or in another suitable way be arranged for transmission of a mainly non-suppressed carrier component.

A minimum suppression over the two-wire circuit 1 is obtained if this has a phase shift for the pilot signal, equal to an integer multiple of 90°. This phase shift is, however, not critical and is made according to the embodiment by connecting the two-wire circuit 1 in cascade with an adjustable phase shifter 16. On the other hand, the phase shift of 90° between the pilot signal and the suppression carrier component in the AM-signals is particularly critical at the two demodulators 5 and 10 in order to ensure a strong suppression firstly between a signal input 17 and a signal output 18 pertaining to the modulator 4 and the demodulator 5, respectively, and, secondly between a signal input 17 and a signal output 20 pertaining to the modulator 11 and the demodulator 10, respectively. These two critical phase shifts are preferably controlled in an automatical way.

According to the example, the oscillator circuit 9 in the master terminal 2 comprises a master oscillator 21 which generates the first oscillator signal to the modulator 4 and a slave oscillator 22, which at the input of the demodulator 5 is controlled by the pilot signal transmitted from the modulator 4 and generates the second oscillator to the demodulator 5. The oscillator circuit 15 in the slave terminal 3 comprises two slave oscillators 23 and 24 which, at the input of the demodulator 10 are controlled by the pilot signal transmitted from the modulator 4 in the master terminal 2 and generate the third and fourth oscillator signal, respectively, to the modulator 11. The slave modulators 22, 23 and 24 comprise, according to the example phase locked loops.

The slave oscillator 24 has a control input 25 connected to the signal output 20 of the demodulator 10 via a minimum locked differentiating circuit 26, an envelope detecting circuit 27 and a band pass filter 28 for a selective transmission of a pilot tone modulated on the AM-signal with the suppressed carrier component transmitted from the modulator 11. The pilot tone which is generated by a tone oscillator 29, is, according to the example, located slightly outside the transmission band for a signal supplied to the signal input 19 and is added to this signal by means of an adding circuit 30. In the master terminal 2, the pilot tone is, according to the example, suppressed at the output 18 from the demodulator 5 by means of a band rejector filter 31. The purpose of the differentiating circuit 26, whose internal construction and co-operation with the slave oscillator 24 will be further described below, is to provide that the level of the pilot tone at the signal output 20 from the demodulator 10 is minimized and such strong suppression between the signal input 19 and the signal output 20 is reached.

FIG. 2 shows a block diagram of a modified embodiment of the system according to the invention. Most of the blocks are identical with those in the preferred embodiment and have the same designation as in FIG. 1. In the master terminal 2, the band reject filter 31 is eliminated. In the oscillator circuit 15 in the slave terminal 3, the slave oscillator 23 is arranged to generate a fifth oscillator signal of the same frequency as the pilot signal transmitted from the modulator 4 in the master terminal 2 and phase displaced 90° relative thereto at the input of the demodulator 10. This fifth oscillator signal is supplied to a demodulator 32, the signal input of which is connected together with the input of the demodulator 10, and the signal output of which is connected to the control input 25 of the slave oscillator 24 via an envelope detecting circuit 33 and a maximum locked differentiating circuit 34. The purpose of the latter, whose inside construction and co-operation with the slave oscillator are essentially the same as for the differentiating circuit 26 as it will be further described below, is to provide that the signal level at the output of the demodulator 32 is maximumed, whereby said strong suppression between the signal input 19 and the signal output 20 is obtained.

FIG. 3 shows a circuit diagram of a chosen embodiment of the slave oscillator 24 and the co-operating minimum locked differentiating circuit 26 in the slave terminal 3 in FIG. 1. In the slave oscillator 24, a phase comparator 35 has a first input 36 arranged to be fed with the pilot signal from the input stage 13 and a second input 37 arranged to be fed with an oscillator signal, that has the same frequency as the pilot signal, from a voltage controlled oscillator circuit 38 which has a control input 39, to which an output 40 of the phase comparator 35 is connected via an inverting input of an integrating operation amplifier circuit 41. The output 40 of the phase comparator 35 supplies a control voltage which has a zero level upon phase coincidence at the two inputs 36 and 37 of the phase comparator 35 and which has a negative level when the oscillator signal at the input 37 lags behind and positive level when it is leading relative to the pilot signal on the input 36. According to the example the phase comparator 35 consists of two AND-gates each having an inverting input and being connected to a respective input of an operation amplifier.

The voltage controlled oscillator circuit 38 has an output 42 arranged to supply the fourth oscillator signal to the modulator 11 with a phase shift of 90° relative to the oscillator signal fed to the input 37 of the phase comparator 35. According to the example the oscillator circuit 38 consists of a voltage controlled oscillator the output of which is, on one hand, connected to the input 37 of the phase comparator 35 via two flip-flops connected in cascade and, on the other hand, connected to the output 42 via an exclusive OR-circuit which has two inputs connected to a respective outputs of the flip-flops connected in cascade. The fourth oscillator signal obtains relative to the pilot signal at the input 36, a phase shift determined by the minimum locked differentiating circuit 26 in such a way that this, on an input 43, receives the pilot tone from the envelope detector 27 and, on an output 44 supplies via a non-inverting input of the operation amplifier 41 a correction voltage for minimizing the level of the pilot tone. In the differentiating circuit 26, the output 44 in connected to the output of an integrator 45 which is, via an operation amplifier 46, connected to two inverting outputs of a flip-flop 47, arranged to be reversed by a differentiator 48 via a threshold detector 49 when the level of the pilot tone increases. By this circuit arrangement, the level of the pilot tone of the input 43 will slowly pulsate at a low level.

The minimum locked differentiating circuit 26 can easily be converted into the maximum locked differentiating circuit 34 in FIG. 2, by means of an inverting amplifier connected between the threshold detector 49 and the differentiator 48 in FIG. 3. The flip-flop 47 will then be reversed by the differentiator 48 when the signal level on the input 43 decreases whereby the latter will slowly pulse at a high level.

We claim:

1. System for phase division multiplex duplex communication over a two-wire circuit comprising: a master terminal and a slave terminal; said master terminal comprising a first modulator and a first demodulator jointly connected to a first end of the two-wire circuit, the first modulator being arranged to transmit an outgoing AM-signal with an essentially non-suppressed carrier forming a pilot signal and the first demodulator being arranged to receive an incoming AM-signal with a considerably suppressed carrier component having a frequency identical to the frequency of the pilot signal, a first oscillator circuit being arranged to supply the first modulator and the first demodulator with a first and a second, respectively, oscillator signal having a frequency identical to the frequency of the pilot signal and with a deviation from a phase relationship of 90° equal to the absolute value of the total phase shift in the transmission path from the first modulator to the first demodulator via the first end of the two-wire circuit; and the slave terminal comprising a second demodulator and a second modulator jointly connected to a second end of the two-wire circuit and arranged to receive the AM-signal with the pilot signal to transmit, respectively, the AM-signal with the suppressed carrier component, a second oscillator circuit being arranged to supply the second demodulator and the second modulator with a third and fourth, respectively, oscillator signals of a frequency identical to the frequency of the pilot signal and with a deviation from a phase relationship of 90° equal to the absolute value of the total phase shift in the transmission path from the second modulator to the second demodulator via the second end of the two-wire circuit.

2. System according to claim 1 wherein an adjustable phase shifter is connected in cascade with the two-wire circuit in order to provide, between the ends of thereof, a phase shift for the pilot signal equal to an integer multiple of 90°.

3. System according to claim 1 wherein the phase of said second oscillator signal is controlled by a phase locked oscillator provided with said pilot signal received at said first demodulator.

4. System according to claim 1 wherein said second demodulator is supplied with a pilot tone and the phase of said fourth oscillator signal is controlled by a phase locked oscillator having a control input connected to said second demodulator via a band-pass filter tuned to said pilot tone, an envelope detecting circuit and minimum-locked differentiating circuit means.

5. System according to claim 4 wherein said minimum-locked differentiating circuit means comprises a bistable flip-flop switched by a differentiator via a threshold detector.

* * * * *